United States Patent
Beaman et al.

(10) Patent No.: US 7,697,000 B2
(45) Date of Patent: *Apr. 13, 2010

(54) METHOD AND APPARATUS FOR TYPOGRAPHIC GLYPH CONSTRUCTION INCLUDING A GLYPH SERVER

(75) Inventors: Alexander B. Beaman, Cupertino, CA (US); Richard W. Becker, Palo Alto, CA (US); David G. Opstad, Mountain View, CA (US); Michael R. Reed, Chapel Hill, NC (US)

(73) Assignee: Apple Inc, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/776,945

(22) Filed: Feb. 10, 2004

(65) Prior Publication Data

US 2004/0160443 A1 Aug. 19, 2004

Related U.S. Application Data

(63) Continuation of application No. 09/221,276, filed on Dec. 23, 1998, now Pat. No. 6,714,199, which is a continuation of application No. 08/630,864, filed on Mar. 29, 1996, now Pat. No. 5,926,189.

(51) Int. Cl.
*G06F 17/21* (2006.01)
*G09G 5/22* (2006.01)

(52) U.S. Cl. ............... 345/467; 345/468; 345/469

(58) Field of Classification Search ............... 345/469, 345/468, 472, 502, 467; 707/542
See application file for complete search history.

(56) References Cited

U.S. PATENT DOCUMENTS

| | | | |
|---|---|---|---|
| 5,257,351 A | 10/1993 | Leonard et al. | |
| 5,404,450 A | 4/1995 | Szczepanek et al. | |
| 5,412,771 A * | 5/1995 | Fenwick | 345/468 |
| 5,416,898 A | 5/1995 | Opstad et al. | |

(Continued)

OTHER PUBLICATIONS

Erfert Fenton, Apple's Operating-system Extension Promises a Wealth of Exciting New Font Capabilities, Inside Quick Draw GX Fonts, MacWorld, Oct. 1994, pp. 122-125, 127, vol. 11, No. 10 [retrieved from the Internet] [Jun. 13, 1997] [retrieved Apr. 2, 2007] URL< http://web.archive.org/web/19970614041630/http:/www.macworld.com/pages/october.94/feature.1143.html>.

*Primary Examiner*—Jeffery A Brier
(74) *Attorney, Agent, or Firm*—Sawyer Law Group PC

(57) ABSTRACT

A system for typographic glyph construction includes a graphics system, a glyph server coupled to the graphics system, and an operating system coupled to the glyph server. An apparatus for typographic glyph construction of input text in a graphics system running on a computer system and output on an output device of the computer system includes a line layout core unit, a glyph cache unit coupled to the line layout core unit, an open font architecture services unit coupled to the glyph cache unit, at least one scaler unit coupled to the open font architecture unit, a font object management unit coupled to the at least one font scaler, and an attribute group support unit supporting a data structure for communication among the units of the apparatus. A method for processing input text in a graphics system running on a computer system and displaying typographic glyphs on a display device of the computer system includes mapping the input text into glyph codes, forming an initial glyph record array, the initial glyph record array comprising a plurality of glyph records for the glyph codes, processing a layout of the glyph codes to produce an updated glyph record array, rendering the updated glyph record array to produce a final glyph record array, and rendering a display of the typographic glyph output from the final glyph record array.

8 Claims, 4 Drawing Sheets

U.S. PATENT DOCUMENTS

| | | |
|---|---|---|
| 5,526,477 A | 6/1996 | McConnell et al. |
| 5,533,174 A * | 7/1996 | Flowers et al. ............. 358/1.15 |
| 5,577,183 A | 11/1996 | Weyand |
| 5,579,030 A | 11/1996 | Karow |
| 5,586,241 A | 12/1996 | Bauermeister et al. |
| 5,771,034 A * | 6/1998 | Gibson ....................... 345/471 |
| 5,790,126 A | 8/1998 | Ballard et al. |
| 5,909,223 A | 6/1999 | Dowdy et al. |
| 5,926,189 A | 7/1999 | Beaman et al. |
| 5,956,419 A | 9/1999 | Kopec et al. |
| 6,038,575 A | 3/2000 | Jensen et al. |
| 6,043,826 A | 3/2000 | Manning |
| 6,088,041 A | 7/2000 | Ballard et al. |
| 6,175,372 B1 | 1/2001 | Ballard et al. |
| 6,288,726 B1 * | 9/2001 | Ballard ....................... 345/468 |
| 6,714,199 B1 | 3/2004 | Beaman et al. |

* cited by examiner

METHOD AND APPARATUS FOR TYPOGRAPHIC GLYPH CONSTRUCTION INCLUDING A GLYPH SERVER

CROSS-REFERENCE TO RELATED APPLICATIONS

This application is a continuation of U.S. patent application Ser. No. 09/221,276, now U.S. Pat. No. 6,714,199, filed Dec. 23, 1998, which is a continuation of U.S. patent application Ser. No. 08/630,864, now U.S. Pat. No. 5,926,189, filed Mar. 29, 1996.

FIELD OF THE INVENTION

The present invention generally relates to graphic output of text, and more particularly relates to typographic glyph construction of a user's input text within a computer system.

BACKGROUND OF THE INVENTION

Current computer systems provide individuals with opportunities to produce documents of professional quality, such as with desktop publishing software and graphics software programs. The ability to manipulate the appearance of the text within these programs is vital in allowing users greater flexibility and creativity in document production. Included in these manipulations are changes in fonts, justification, size, and other aspects of the appearance, such as bolding and italicizing.

Although most programs can perform manipulations with some level of success, each program has a limitation in its range of manipulations due to design considerations. Some programs, such as QuickDraw GX from Apple Computer, Cupertino, Calif., provide more sophistication and enhanced capabilities than other programs to allow more choices for users. Unfortunately, these enhanced capabilities are normally not transferable to other programs. Thus, attempts to incorporate such capabilities, such as different fonts, from one program into another are also usually quite limited and typically unsuccessful.

Accordingly, a need exists for a flexible and portable system that allows accurate and efficient manipulations of textual data in a graphics system. The present invention addresses such a need.

SUMMARY OF THE INVENTION

The present invention provides method, apparatus, and system aspects that construct typographic glyphs. In a first aspect, an apparatus for typographic glyph construction of input text in a graphics system running on a computer system and output on an output device of the computer system includes a line layout core unit that receives glyph codes and layout controls from the graphics system and determines glyph data descriptions. The apparatus further includes a glyph cache unit coupled to the line layout core unit for receiving the glyph data descriptions and determining if glyph data is in the glyph cache unit. In addition, the apparatus includes an open font architecture services unit coupled to the glyph cache unit for permitting support of multiple font file formats, at least one scaler unit coupled to the open font architecture unit for receiving requests from the open font architecture unit and interpreting font data within a font file, and a font object management unit coupled to the at least one font scaler and handling requests for the font data. The apparatus also includes an attribute group support unit coupled to manipulation of a data structure, the data structure for providing communication amongst the line layout core unit, the glyph cache unit, the open font architecture services unit, the font scaler unit, and the font object management unit.

In accordance with a further aspect of the present invention, a method for processing input text in a graphics system running on a computer system and displaying typographic glyphs on a display device of the computer system includes mapping the input text into glyph codes, and forming an initial glyph record array, the initial glyph record array comprising a plurality of glyph records for the glyph codes. The method further includes processing a layout of the glyph codes to produce an updated glyph record array, rendering the updated glyph record array to produce a final glyph record array, and rendering a display of the typographic glyph output from the final glyph record array.

In a further aspect of the present invention, a system for typographic glyph construction includes a graphics system, a glyph server coupled to the graphics system, and an operating system coupled to the glyph server.

With these aspects of the present invention, an integration of components necessary to render lines of glyphs is produced. The integration of these components results in a flexible and portable unit that acts as a resource for calls for glyphs between a graphics and operating system, thus acting a sort of glyph server for the systems. These and other advantages of the aspects of the present invention will be more fully understood in conjunction with the following detailed description and accompanying drawings.

DETAILED DESCRIPTION

The present invention relates to typographic glyph construction in a computer system. For purposes of this discussion, typographic glyph construction refers to the formation of graphical representations displayed on a screen or output from the computer system based on the textual inputs and manipulations by a user, usually made via an input device, such as selection of keys on a keyboard. The following description is presented to enable one of ordinary skill in the art to make and use the invention and is provided in the context of a patent application and its requirements. Various modifications to the preferred embodiment and the generic principles and features described herein will be readily apparent to those skilled in the art.

In order to more fully describe the present invention, some definitions for the terminology used herein is now provided. Text refers to words of something written or printed. Within a line of text, are several runs of text. A run of text refers to text sharing a same style within a line of text. Displaying of text occurs in the form of scripts, where scripts are styles of writing with characters usually resembling handwriting. Script examples include Roman, Arabic, Hindi, Chinese, Greek, Hebrew, etc.

Characters are abstract objects having a single and unique semantic or phonetic meaning. Glyphs, as opposed to characters, represent the visual graphical appearance of a character. The particular representation of a character by a glyph is done in the context of the font, the font being a collection of glyphs which typically have an element of design consistency in their appearance. In a preferred embodiment, the font contains a table that can map characters in one or more standard encoding schemes to glyph codes and those glyph codes have meaning within that font.

Within a given font, such as Geneva, Helvetica, Times, etc., aspects including serifs, stroke thickness, ligatures, and contextual forms have a degree of commonality. Serifs refer to fine lines in printing used for finishing off main strokes of a character, while ligatures refer to rendering forms that represent combinations of two or more characters, such as the combination of an "f" and an "i" into "fi". Contextual forms are alternate appearances of a glyph whose use is dependent on certain contexts. Thus, the same character within a font may have different appearances, i.e., separate glyphs, each of which may have different contextual forms. For example, in Arabic, the same character can change appearance depending upon its position within a word.

Figure 1:
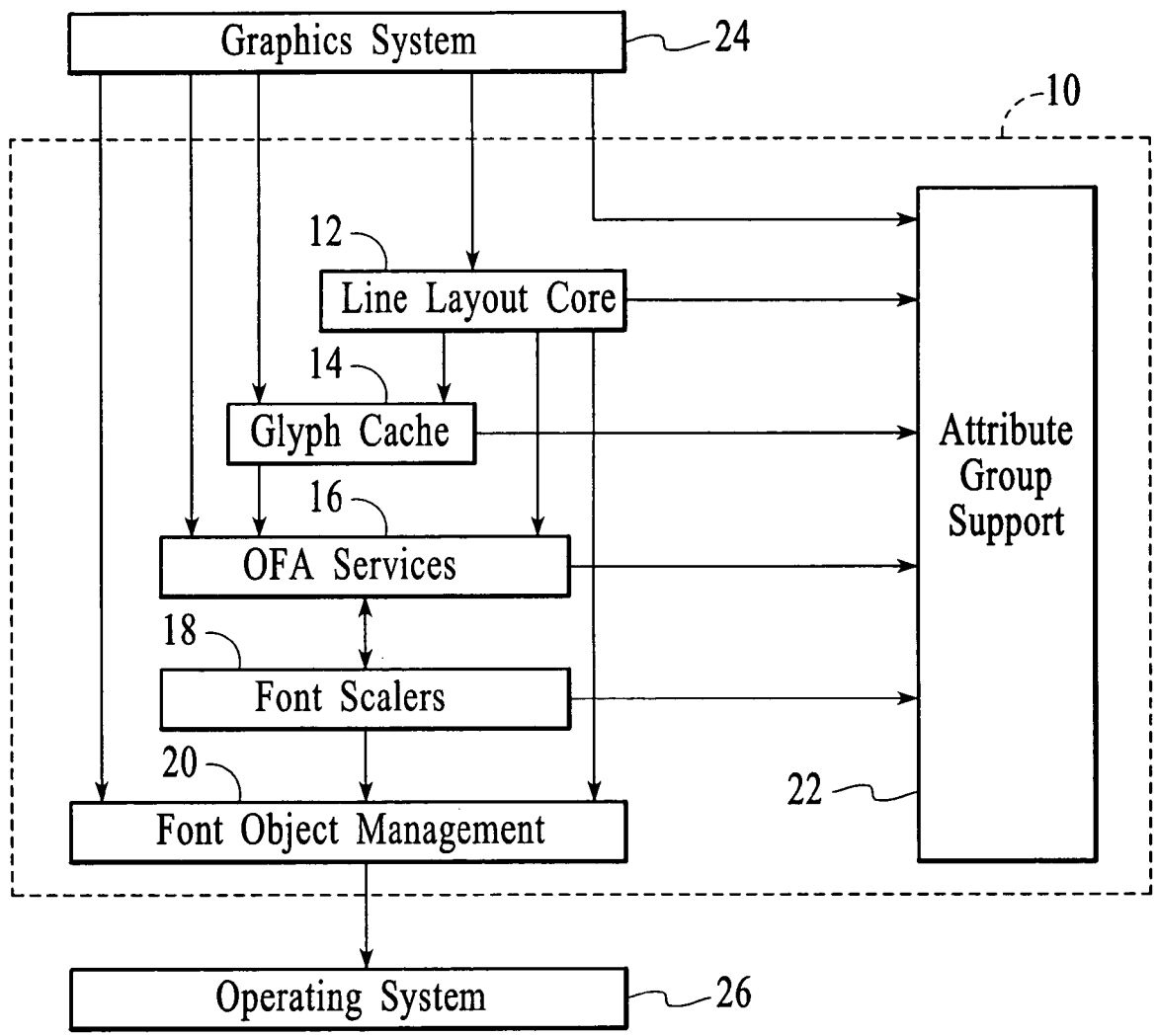
FIG. 1 illustrates a block diagram of a system including a glyph server in accordance with the present invention.

A block diagram illustrating components of a glyph server 10 for typographic glyph construction in accordance with the present invention is presented in FIG. 1. Included in the glyph server 10 are line layout core unit 12, glyph cache unit 14, open font architecture services unit 16, one or more font scalers 18, a font object management unit 20, and an attribute group support unit 22. Although the following provides a basic description of each component of the glyph server 10, the processes and operation of the glyph server 10 are presented in more detail with reference to the remaining figures.

As shown in FIG. 1, the glyph server 10 interacts between a graphics system 24, such as QuickDraw, QuickDraw GX, and a computer operating system 26, such as System 7 from Apple Computer, running on a computer system, such as one of the family of Apple Macintosh computer systems. The arrows in FIG. 1 illustrate a direction of operation calls among components of glyph server 10 to represent which components interact during the typographic glyph construction. Thus, the graphics system 24 from whom the text data is received by glyph server 10 suitably interacts with five of the glyph server 10 components through API (application program interface) calls, as is well appreciated by those skilled in the art. One such API call is received by the line layout core unit 12. The line layout core unit 12 performs sophisticated linguistic and stylistic processing of a line of glyphs using information stored in a public format font data tables in the system memory. The essential processing of the line layout core unit 12 is described in more detail later with reference to FIG. 3.

Accessing the font data tables, which store data for each particular font, suitably occurs by the line layout core unit 12 via the font object management unit 20. The font object management unit 20 is responsible for several functions, including knowing where the fonts are in the operating system 26, caching pieces of font file data for rapid reissue, and handling the requests for font file data itself. Further the font object management unit 20 capably performs these functions transparently to the rest of the glyph server 10 components.

Interpreting the proprietary or font format specific data within each font file provided from the font object management unit 20 is suitably handled by the font scalers 18. The appropriate font scalers 18 are preferably dispatched by the open font architecture (OFA) services unit 16. The OFA services unit 16 provides a mechanism that permits support of multiple font file formats and provides an interface for the glyph cache unit 14 to the font scales supporting the font file formats. The glyph cache unit 14, e.g., a 480 KB cache, suitably handles multiple requests at a time and manages the memory to store as much glyph data as possible.

In operation, the glyph cache unit 14 receives requests for glyph data and either has the data stored in the cache unit 14 or retrieves the data via the OFA services unit 16. By way of example, for a new request, an access sequence for glyph cache unit 14 according to a preferred protocol includes composing a glyph data description attribute group. For purposes of this discussion, a glyph data description attribute group describes desired glyph data including the glyph metrics or renderings and also may include specifics on the metrics, e.g., fractional or device metrics, or on the renderings, e.g., antialiased, as well as any other additional attributes required by the metrics or renderings. Attribute groups themselves preferably refer to structured blocks of memory organized as tag plus value pairs where variable numbers of variable length tagged data items are held with the values retrieved by knowing the appropriate tags, as is well understood by those skilled in the art.

The glyph data description attribute group is suitably used by the glyph cache unit 14 to organize storage of data results for a given strike description and is passed on to the appropriate font scaler 18 via the OFA services unit 16. A strike description refers to an attribute group type specifying an ID for the font used, transformation (e.g., 3×3 transformation matrix, point size, resolution, spot size, and flags), and font variation specification. Minimally, the strike description includes identification of the font scaler to be used to generate the glyph data.

The glyph data generation by the OFA services unit 16 preferably occurs according to a predetermined protocol. By way of example, for a new request, the glyph cache unit 14 uses OFA services API call to register the strike with the appropriate scaler 18 using the strike description. In return, the scaler 18 provides a moniker to accelerate the processing of the strike, as is well understood by those skilled in the art. The scaler 18 may cache an internal state. The OFA services unit 16 then requests information from the scaler 18 about the glyph data by supplying the glyph data description, strike description, and moniker. The scaler 18 then returns size information for the glyph data, such as whether the data is fixed or variable length, and exact or estimated size for each data item.

The glyph cache unit 14 uses the information aid prepares a memory area for the receipt of glyph data items from the scaler 18. The glyph cache unit 14 then uses an OFA API call to request the glyph data items from the scaler 18 for a set of glyphs, provides a pointer to the glyph cache unit 14 memory area to receive the glyph data items, the glyph data description, the strike description, the moniker, and a glyph result array. The scaler 18 generates as many glyph data items as possible that will capably fit in the designated glyph cache unit 14 memory area. When the glyph data items are of variable length, the scaler 18 indicates the number of glyph data items completed and the size of each. Thus, the font scalers 18 suitably deposit their generated results directly into the memory area of the glyph cache unit 14, avoiding data copying. Further, the glyph cache unit 14 remains unaware of the contents of the glyph data items, including the specifics of the new data descriptions while efficiently managing the memory to store them.

Suitably, for subsequent requests for glyph data generation via OFA services unit 16, the moniker and the strike description are obtained from the glyph cache unit 14. The sequence then proceeds as described above from the point of preparation of the cache to receive the data items from the scaler 18.

Continuing with the glyph cache access protocol, once the glyph data description attribute group is composed, a glyph data vector ID from the glyph cache unit 14 is obtained by providing the glyph data description and the strike description, which locks the identified glyph vector. A glyph vector is a strike description coupled with a glyph data descriptor that provides a set of cached glyph data items. After obtaining the glyph data vector ID, one or more glyph data addresses in the context of the glyph data vector ID are requested. The glyph data items are then used, and the lock on the glyph vector is released. For subsequent requests, instead of composing the glyph data description attribute group, a previously obtained vector ID is validated to lock the glyph vector and possibly return a new, updated vector ID before continuing with the rest of the sequence, as described above. The data description must always be supplied, in case the vector ID has gone bad.

In terms of the internal operations of the glyph cache unit 14 during an access sequence, a request is received by the glyph cache unit 14 for particular glyph data. If the glyph data is not in the glyph cache unit 14, the glyph cache unit 14 makes a request for the glyph data from the appropriate font scaler 18 via the OFA services unit 16. When the data is within the glyph cache unit 14 or generated via the OFA services unit 16, a pointer to each data item for the glyph within the glyph cache unit 14 is added to a glyph record array for the glyph data requested. A glyph record array preferably refers to an array of glyph records which are stored in display order and which contain various data concerning a glyph. The function and contents of the glyph record array are described in more detail with reference to the remaining figures.

If there is more glyph data requested, the sequence repeats itself until all requests are completed. It should be appreciated that for glyph data that is too large to be contained within the glyph cache unit 14, the request may need to broken up into separate requests. Thus, the sequence would suitably be repeated until all of the requests are completed.

In addition to the glyph cache unit 14, further included in glyph server 10 is the attribute group support unit 22. The attribute group support unit 22 suitably comprises routines to manipulate data structures used by all of the components in the glyph server 10 for communication. In general the attribute group support unit 22 provides a body of code that works within the structure of glyph server 10 to initialize, add, and access attributes in the attribute groups. In addition, the attribute group support unit 22 allows attribute group comparison for identical and congruent matches. With the ability to perform such comparisons, attribute groups are readily used as search keys in a cache, such as glyph cache unit 14, as is well appreciated by those skilled in the art.

Figure 2:
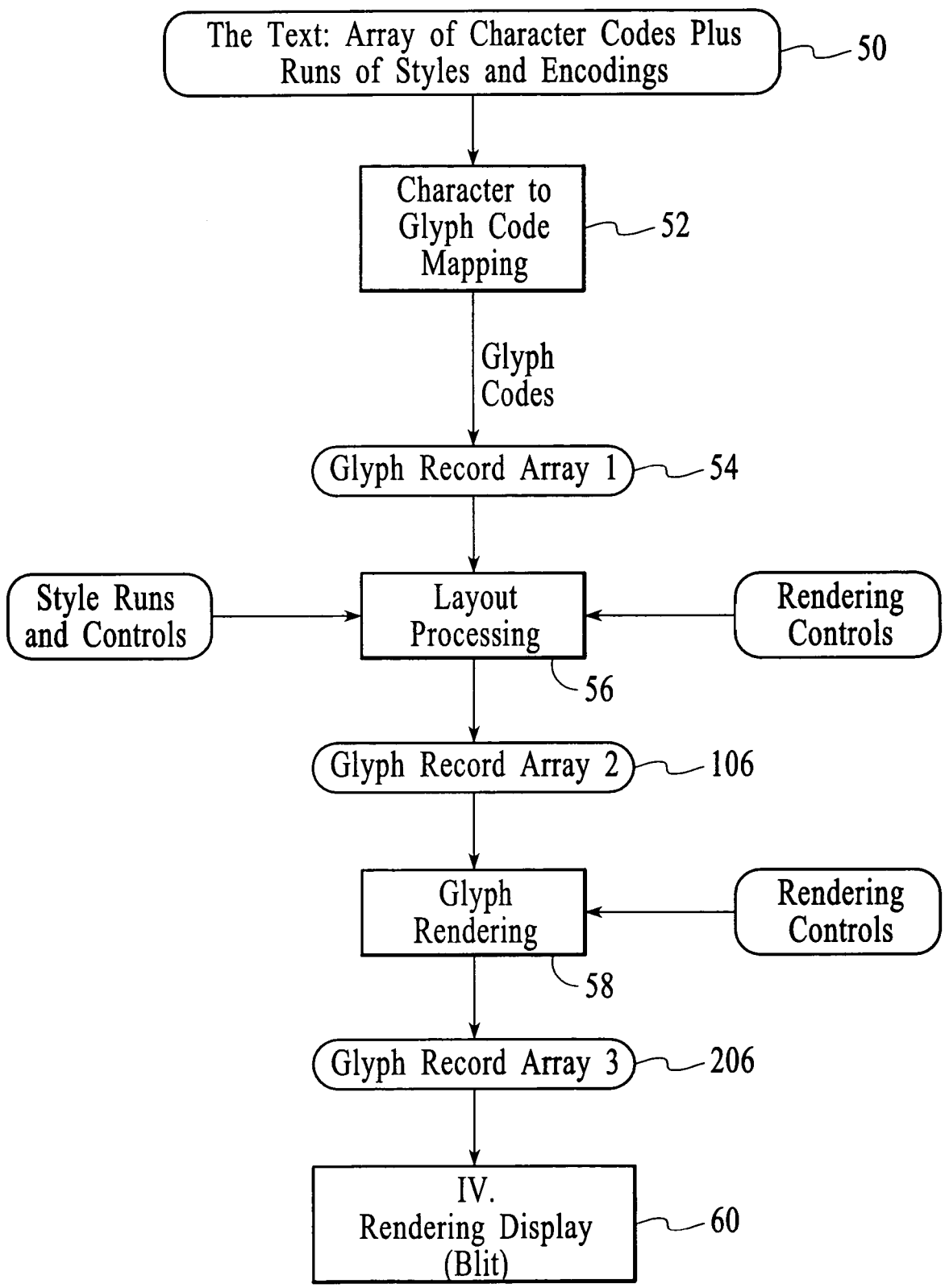
FIG. 2 illustrates a process of forming a glyph record array with the glyph server in accordance with the present invention.

FIG. 2 illustrates a flow diagram of the operations of the glyph server 10 components in more detail. The processing done by the glyph server 10 begins with the input of text via step 50. The text, as described above, includes an array of character codes with the runs of encodings for the input text. A style includes a font identifier, font size, matrix, flags and layout controls. Encodings for input text are suitably those unique codes assigned within a particular encoding scheme, such as MacIntosh Arabic, Macintosh Roman or Unicode, for each character. Once the text is input, corresponding glyph codes for each character are generated via step 52. Such glyph codes are suitably stored in tables in the fonts, and are mapped to each character to begin formation of an initial glyph record array 54 for each glyph for the input text. Font object unit API routine used to map clear to glyph code using a table in the font.

For purposes of this discussion, a glyph record array is formed and added to during each phase of the processing by the glyph server 10. The initial glyph record array size is set by the graphics system 24. Relevant fields within the record array are designated with offsets by the graphics system 24 to the glyph server 10. For each phase of processing, some fields within the glyph record array are necessary and identified at the offsets where the code for each process reads/writes to those fields, while ignoring any other fields. Thus, the glyph record array provides a flexible structure that allows various phases of processing to operate on the same array.

Figure 3:
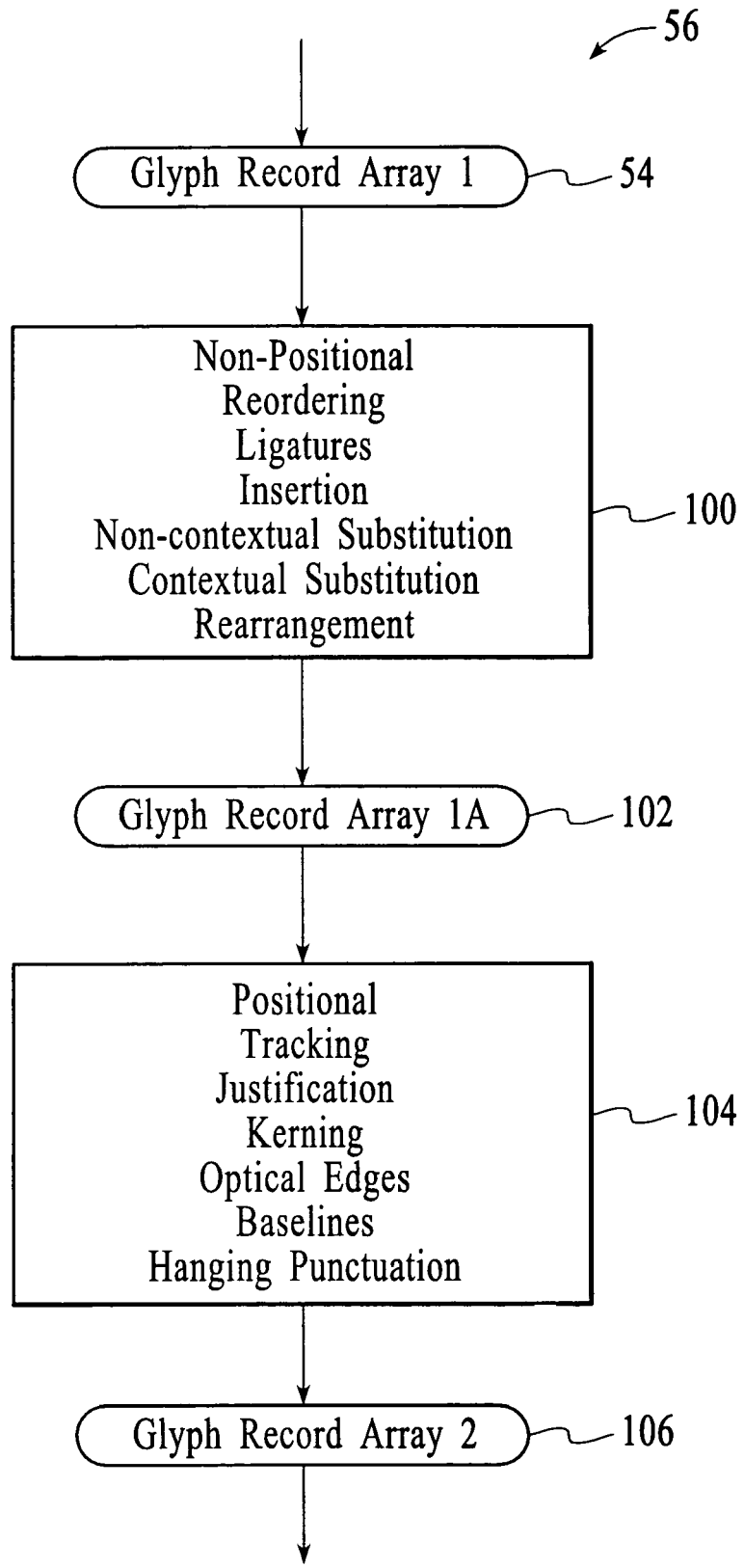
FIG. 3 illustrates a layout processing step of FIG. 2 in greater detail.

Once the glyph record array formation has completed, layout processing occurs via step 56, the details of which are discussed with reference to FIG. 3. As shown in FIG. 3, the initial glyph record array 54 is altered by positional and non-positional processing of the glyph codes by the line layout core unit 12 (FIG. 1). Glyph record arrays are the data representation of a line of glyphs. Although the operations of the line layout unit 12 are described herein, more specific details on the line layout unit 12 are suitably provided in U.S. Pat. No. 5,416,898 entitled "Apparatus and Method for Generating Textual Lines Layouts", issued May 16, 1995 to Opstad, et al., assigned to the assignee of the present invention, and incorporated herein by reference in its entirety.

The non-positional processing step 100 refers to those adjustments, such as reordering of glyphs, ligature formations, insertions of glyphs, non contextual and contextual substitutions of glyphs, and rearrangement of glyphs, that are necessary to have the right glyph codes in the right order for display purposes. These adjustments to the non-positional aspects of the glyphs occur for linguistic and stylistic requirements to result in the proper display of the input text. There may be layout controls to effect a stylistic or linguistic behavior.

Once the non-positional adjustments have been made via step 100, they are added to the glyph record array via step 102. The glyph record array is then processed by the line layout core unit 12 for positional adjustments via step 104. Positional adjustments include tracking, justification, kerning, optical edges, baselines, and hanging punctuation adjustments. Kerning values for adjustments are preferably obtained from a common kerning table format or from a font scaler 18 via the OFA services unit 16, if necessary. There may be further glyph code manipulations (insertion, deletion and replacement). With these adjustments made, the glyph record array contains the final set of glyphs in the order that they will be displayed and with the adjustments to be applied to each glyphs' position, i.e., the positioning deltas, during display to form an updated glyph record array 106.

Figure 4:
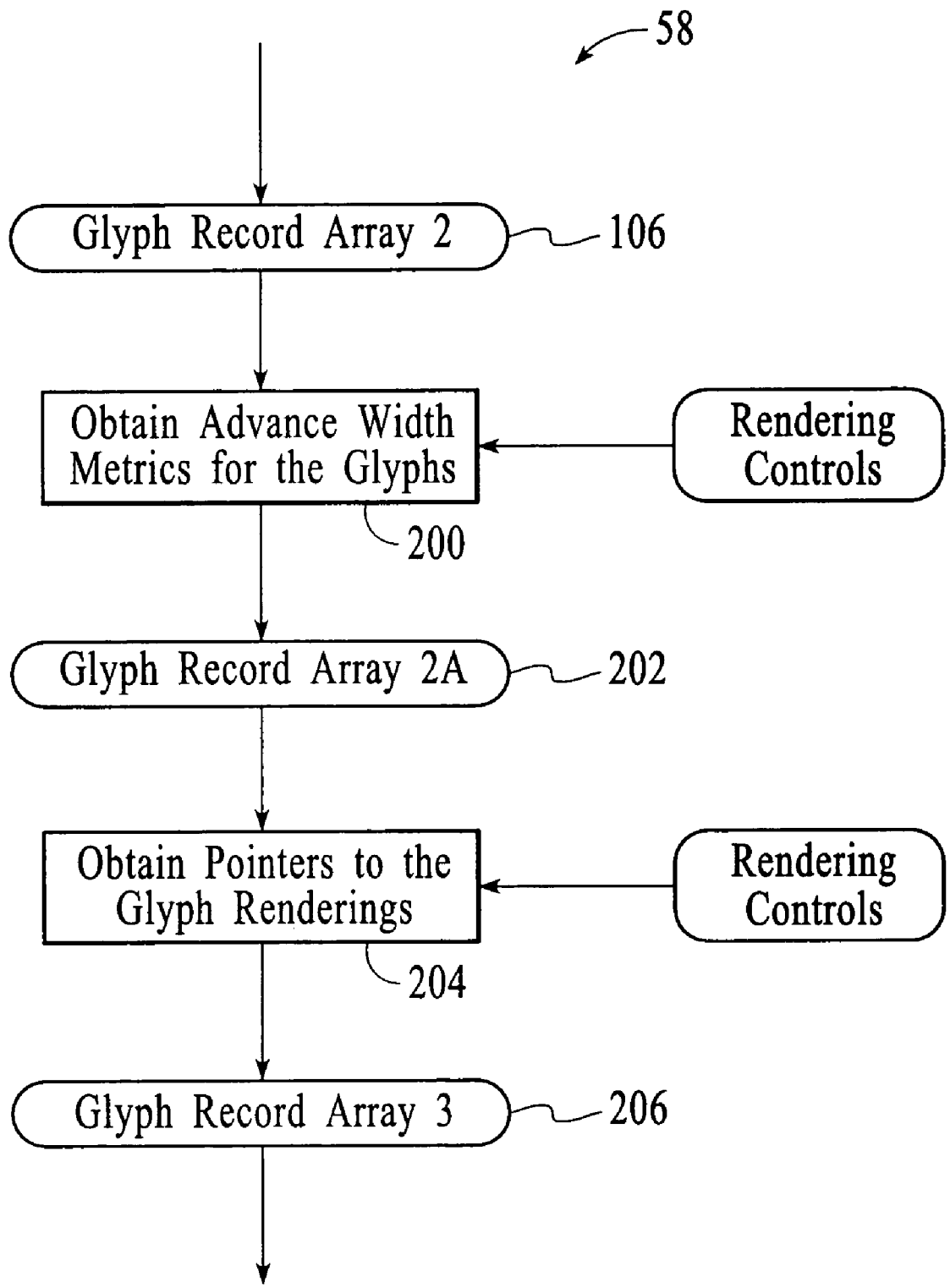
FIG. 4 illustrates a glyph rendering step of FIG. 2 in greater detail.

Referring back to FIG. 2, once the layout processing is completed using both style runs and controls and rendering controls to result in the updated glyph record array 106, processing continues with the glyph rendering via step 58, as described in more detail with reference to FIG. 4. As shown in FIG. 4, the advance widths for the glyphs in the updated glyph record array 106 are obtained in step 200. Preferably, the graphics system 24, using the glyph cache protocol, as described above, directs the glyph cache unit 14 to deliver the metrics and then the renderings for all of the glyphs in the glyph array. The graphics system 24 controls what type of rendering is required, since the types of renderings that can be displayed are known by the graphics system 24. The advance widths for each glyph in the array are thus added to the array to produce glyph record array 202.

Pointers to the glyph renderings in the glyph cache unit 14 are then obtained from the glyph cache unit 14 via step 204. The pointers to the associated renderings are then placed in the array to form final glyph record array 206. The glyphs in the final glyph record array 206 are now ready for display with the associated positioning deltas and advance widths in the final glyph record array 206 for each glyph. As shown by FIG. 2, with the final glyph record array 206, the processing by the glyph server 10 is completed. The rendering display of the glyphs is suitably performed via step 60 by the computer system.

Thus, with the present invention, the ability to produce enhanced functionality for glyph rendering is achieved. Further, the present invention provides an integrated glyph server that is portable and flexible to produce the glyph renderings. Additionally, the glyph server is readily adaptable for use with a variety of graphics systems and is thus seemingly unlimited in the numbers of renderings capable of being produced, the numbers of renderings depending upon the graphics system itself. Also, new scalers and new font formats are easily added to the system of the present invention without modifying the major components of the system, which improves adaptability and provides an expandable glyph production system.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined by the following claims.

What is claimed is:

1. A method for glyph construction of a line of text in a single computer system, wherein font data tables are stored in the single computer system, the method comprising:
   utilizing a glyph server to perform the following operations;
      receiving a request, by a glyph cache unit, for glyph data for the line of text;
      managing a plurality of requests for glyph data at a time, and managing a memory to store a maximum amount of glyph data in the glyph cache unit, wherein the glyph cache unit is in communication with the single computer system graphics system for accessing font data tables;
      receiving glyph codes and determining glyph data descriptions in a line layout core module;
      receiving the glyph data descriptions and determining if glyph data is in the memory in the glyph cache unit, wherein the glyph cache unit handles multiple requests at a time;
      permitting support for multiple font file formats by an open font architectural services; and
      sharing data stored in the memory with the at least one software client to decrease glyph construction time.

2. The method of claim 1, further comprising:
   receiving requests from the open font architecture services unit in at least one scaler unit and interpreting font data with a font file.

3. The method of claim 2, further comprising:
   handling requests for the font data in a font object management module.

4. A method for typographic glyph construction of a line of text in a graphics system running on a single computer system and output on an output device of the single computer system, the method comprising:
   utilizing a glyph server to perform the following operations;
      receiving glyph codes from the graphics system in a line layout core unit and determining glyph data descriptions;
      receiving the glyph data descriptions in a glyph cache unit and determining if glyph data is in the glyph cache unit;
      permitting support of multiple font file formats with an open font architecture services unit;
      receiving requests from the open font architecture services unit in at least one font scaler unit and interpreting font data within a font file;
      handling requests for the font data in a font object management unit; and
      supporting a data structure for communication among the line layout core unit, the glyph cache unit, the open font architecture services unit, the font scaler unit, and the font object management unit.

5. The method of claim 4, further comprising:
   processing a layout of the glyph codes to produce a glyph record array.

6. The method of claim 5, further comprising:
   processing the layout for positional and non-positional adjustments.

7. The method of claim 5, further comprising:
   providing metrics and renderings to update the glyph code array.

8. The method of claim 7, further comprising:
   updating the glyph code array with pointers to glyph renderings.

* * * * *

UNITED STATES PATENT AND TRADEMARK OFFICE
CERTIFICATE OF CORRECTION

| | | |
|---|---|---|
| PATENT NO. | : 7,697,000 B2 | Page 1 of 1 |
| APPLICATION NO. | : 10/776945 | |
| DATED | : April 13, 2010 | |
| INVENTOR(S) | : Alexander B. Beaman et al. | |

It is certified that error appears in the above-identified patent and that said Letters Patent is hereby corrected as shown below:

In column 3, line 3, delete "visual" and insert -- visual, --, therefor.

In column 4, line 47, delete "aid" and insert -- and --, therefor.

In column 5, line 43, delete "general" and insert -- general, --, therefor.

In column 5, line 60, delete "Macintosh" and insert -- MacIntosh --, therefor.

Signed and Sealed this
Twenty-fifth Day of October, 2011

David J. Kappos
*Director of the United States Patent and Trademark Office*